(12) United States Patent
Ji et al.

(10) Patent No.: US 10,159,097 B2
(45) Date of Patent: Dec. 18, 2018

(54) SIGNALING AND DETERMINATION OF SLOT AND MINI-SLOT STRUCTURE

(71) Applicant: QUALCOMM Incorporated, San Diego, CA (US)

(72) Inventors: Tingfang Ji, San Diego, CA (US); Joseph Binamira Soriaga, San Diego, CA (US); Peter Gaal, San Diego, CA (US); Jing Jiang, San Diego, CA (US); John Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,761

(22) Filed: Sep. 22, 2017

(65) Prior Publication Data

US 2018/0098361 A1    Apr. 5, 2018

Related U.S. Application Data

(60) Provisional application No. 62/402,966, filed on Sep. 30, 2016.

(51) Int. Cl.
*H04W 74/08* (2009.01)
*H04L 12/701* (2013.01)
*H04L 5/00* (2006.01)

(52) U.S. Cl.
CPC ....... *H04W 74/0866* (2013.01); *H04L 5/0007* (2013.01); *H04L 5/0092* (2013.01); *H04L 45/00* (2013.01); *H04L 5/0053* (2013.01)

(58) Field of Classification Search
None
See application file for complete search history.

(56) References Cited

U.S. PATENT DOCUMENTS 9,820,281 B1* 11/2017 Werner ............ H04W 72/0453
9,942,898 B2*  4/2018 Dinan ................ H04L 5/0098
(Continued)

OTHER PUBLICATIONS

Huawei et al., "Discussion on Control Channel Design", 3GPP Draft; R1-167203, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051125772 , Retrieved from the Internet: URL:http://www.3gpp.org/ftp/Meetings_3GPP_SYNC/RAN1/Docs [retrieved on Aug. 21, 2016], 6 pages.
(Continued)

*Primary Examiner* — Kodzovi Acolatse
(74) *Attorney, Agent, or Firm* — Qualcomm IP Dept.; James Hunt Yancey, Jr.

(57) ABSTRACT

Wireless communications systems, methods, and techniques related to signaling and determining slot and mini-slot structures are provided. A first wireless communication device transmits a first signal according to a first numerology including at least a first tone spacing. The first signal indicates a second numerology including at least a second tone spacing. The first wireless communication device transmits a second signal according to the second numerology. The first signal includes a physical broadcast channel (PBCH) signal. The second numerology is independent from the first numerology. Different slot/mini-slot structures may be utilized for varying channel types to support mixed numerology arrangements. Embodiments may utilize single and varied slot structures; single slot structures may be decoupled from transmission numerology and varied slot structures may be defined based on reference numerology. Other aspects, embodiments, and features are also claimed and described.

24 Claims, 14 Drawing Sheets

(56) References Cited

U.S. PATENT DOCUMENTS

| | | | | |
|---|---|---|---|---|
| 2016/0352551 | A1* | 12/2016 | Zhang | H04L 27/2602 |
| 2017/0118054 | A1* | 4/2017 | Ma | H04L 27/2607 |
| 2017/0201968 | A1* | 7/2017 | Nam | H04W 72/042 |
| 2017/0310433 | A1* | 10/2017 | Dinan | H04W 76/27 |
| 2017/0310531 | A1* | 10/2017 | Dinan | H04W 36/0072 |
| 2017/0311317 | A1* | 10/2017 | Dinan | H04W 72/0446 |
| 2017/0318594 | A1* | 11/2017 | Babaei | H04W 72/087 |
| 2017/0318595 | A1* | 11/2017 | Dinan | H04W 72/10 |
| 2017/0332359 | A1* | 11/2017 | Tsai | H04B 7/0617 |
| 2017/0353972 | A1* | 12/2017 | Babaei | H04W 72/14 |
| 2017/0359791 | A1* | 12/2017 | Onggosanusi | H04L 5/0023 |

OTHER PUBLICATIONS

International Search Report and Written Opinion—PCT/US2017/053125—ISA/EPO—dated Nov. 28, 2017.

NEC: "Discussion on Numerology Multiplexing", 3GPP Draft; R1-166637, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051125482, Retrieved from the Internet: URL:http://www.3gpp.org/ftp/Meetings_3GPP_SYNC/RAN1/Docs/ [retrieved on Aug. 21, 2016], 2 pages.

\* cited by examiner

| Transmission Payload | | Grant/signaling | PHY channel | Reference numerology for defining slot |
|---|---|---|---|---|
| DL | MIB | PSS/SSS | PBCH | SSS or PSS or PBCH |
| | SIB | PDCCH | PDSCH | PDCCH or PDSCH |
| | RAR | PDCCH | PDSCH | PDCCH or PDSCH |
| | Unicast DL data | PDCCH | PDSCH | PDCCH or PDSCH |
| UL | UL ACK/NAK | PDCCH | PUCCH | PDSCH or PDCCH or PUCCH |
| | UL CSI | Semi-static | PUCCH | PUCCH |
| | UL SRS | Semi-static | SRS | SRS |
| | UL SR | Semi-static | PUCCH | PUCCH |
| | Unicast UL data | PDCCH | PUSCH | PDCCH or PUSCH |
| | UL RACH | Semi-static | PRACH | PRACH or SSS or PSS |
| SL | data | Preamble | PSSCH | Preamble or PSSCH |

FIG. 11

SIGNALING AND DETERMINATION OF SLOT AND MINI-SLOT STRUCTURE

CROSS REFERENCE TO RELATED APPLICATIONS

The present application claims priority to and the benefit of the U.S. Provisional Patent Application No. 62/402,966, filed Sep. 30, 2016, which is hereby incorporated by reference in its entirety as if fully set forth below and for all applicable purposes.

TECHNICAL FIELD

The technology discussed in this disclosure relates generally to wireless communication systems, and more particularly to signaling and determination of slot and mini-slot structures (e.g., for use with $5^{th}$ Generation (5G) new radio (NR) network deployments). Embodiments enable and provide solutions and techniques for wireless communication devices to communicate multiple transmission numerologies that may be decoupled from a reference slot structure defining a scheduling unit.

INTRODUCTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Typically, a wireless communication system comprises several base stations (BSs), wherein each BS communicates with a mobile station or user equipment (UE) using a forward link and each mobile station (or access terminal) communicates with base station(s) using a reverse link.

5G NR is a next generation wireless technology designed to meet the increasing demand for wireless data traffic. NR is an orthogonal frequency division multiplexing (OFDM)-based system that supports scalable numerologies including various tone spacing, such as 15, 30, 60, 120, and 240 kilohertz (kHz).

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms and techniques for signaling slot structures, mini-slot structures, and/or transmission numerologies. A network may employ multiple (or mixed) numerologies (e.g., subcarrier spacing or tone spacing) for communications. In an embodiment, a base station (BS) may transmit synchronization signals and system information signals based on a pre-determined numerology and a predetermined slot structure to enable user equipment (UEs) to perform initial network access. System information signals may indicate a numerology for subsequent communications, for example, for communicating other system information signals and/or random-access signals. In some embodiments, after initial network access, the BS may further indicate various transmission numerologies for communicating with the UEs in a connected mode.

For example, in an aspect of the disclosure, a method of wireless communication includes transmitting, by a first wireless communication device, a first signal according to a first numerology including at least a first tone spacing. A first signal can indicate a second numerology including at least a second tone spacing. The method may also include transmitting, by the first wireless communication device, a second signal according to the second numerology.

In an additional aspect of the disclosure, a method of wireless communication includes receiving, by a first wireless communication device, a first signal according to a first numerology including at least a first tone spacing, wherein the first signal indicates a second numerology including at least a second tone spacing; and receiving, by the first wireless communication device, a second signal according to the second numerology.

In an additional aspect of the disclosure, an apparatus includes a transceiver configured to transmit a first signal according to a first numerology including at least a first tone spacing, wherein the first signal indicates a second numerology including at least a second tone spacing; and transmit a second signal according to the second numerology.

In an additional aspect of the disclosure, an apparatus includes a transceiver configured to receive a first signal according to a first numerology including at least a first tone spacing, wherein the first signal indicates a second numerology including at least a second tone spacing; and receive a second signal according to the second numerology.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 11 is a table illustrating examples for defining numerologies for various channels according to embodiments of the disclosure.

DETAILED DESCRIPTION

Figure 1:
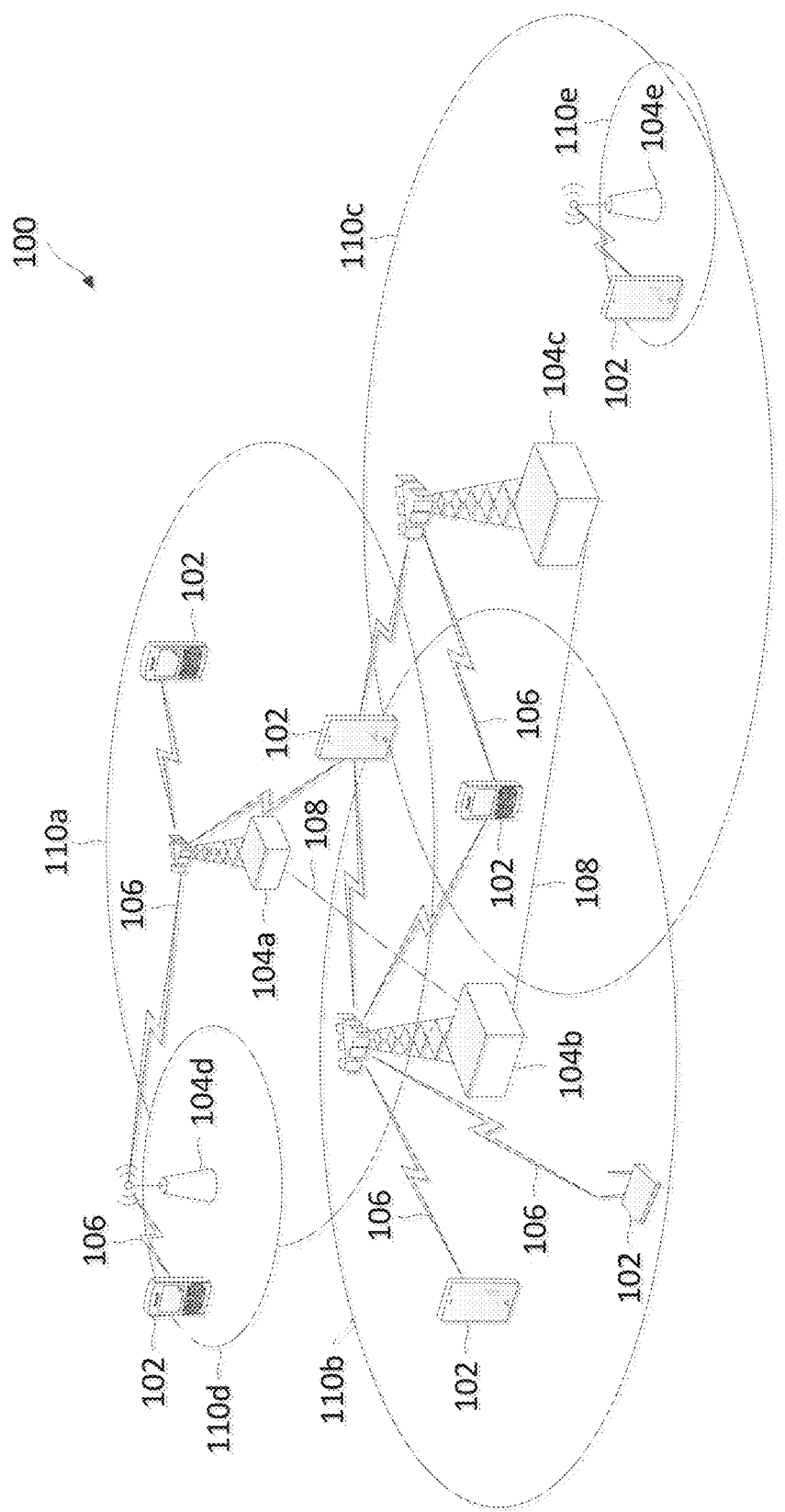
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network.

A network (e.g., a NR network) may employ slots and mini-slots for transmission. The slots and mini-slots structures may be defined based on reference transmission numerologies. However, different channel signals may be transmitted using different transmission numerologies. Thus, there is a need for techniques to signal and/or determine slot structures, mini-slot structures, and/or transmission numerologies.

The present disclosure describes mechanisms and techniques for signaling slot/mini-slot structures and transmission numerologies. These innovations may be useful in mixed-numerology systems where slot structure determinations may be challenging. In one embodiment, a single slot structure is used for communicating in all channels. In one example, a slot structure may be used for a particular frequency band, in a network. In one example, a BS transmits a physical broadcast channel (PBCH) signal to signal a numerology (e.g., a tone spacing) and a slot structure that is defined based on the numerology. Slot structures may be decoupled from a transmission numerology (i.e., unrelated to or separated from causing ambiguity). In another embodiment, different slot structures are defined for different channel signals. For example, a BS transmits a PBCH to signal a downlink (DL) control transmission numerology for a slot structure. The BS may transmit a DL control message (e.g., a grant) according to the DL control transmission numerology. DL control messages may indicate a data transmission numerology for data transmissions.

While aspects and embodiments are described in this application, those skilled in the art will understand that implementations and use cases may come about in many different arrangements and scenarios. Innovations described herein may be implemented across many differing platform types, shapes, sizes, packaging arrangements, for example, via integrated chip embodiments and other non-module-component based devices (e.g., end-user devices, vehicles, communication devices, computing devices, industrial equipment, retail/purchasing devices, medical devices, AI-enabled devices, etc.). While some claims may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations.

Now turning specifically to the figures, FIG. 1 illustrates a wireless communication network 100 according to embodiments of the present disclosure. The network 100 may include a number of UEs 102, as well as a number of BSs 104. A BS 104 may be a station that communicates with the UEs 102 and may also be referred to as a base transceiver station, a node B, an Evolved Node B (eNodeB) or a next Generation Node B (gNB), an access point, and the like.

The BSs 104 may include an Evolve Node B (eNodeB). A BS 104 may be a station that communicates with the UEs 102 and may also be referred to as a base transceiver station, a node B, a an access point, and the like.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, an IoT device, vehicle, medical device, industrial equipment, wearable, sports equipment, implantable device, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the BSs 104 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. In a TDD mode, UL and DL transmissions occur at different time periods using the same frequency band. For example, a subset of the subframes in a radio frame may be used for DL transmissions and another subset of the subframes may be used for UL transmissions. The DL and UL subframes can be shared among the BSs 104 and the UEs 102, respectively.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In an embodiment, the BSs 104 can transmit synchronization signals (e.g., including a primary synchronization signal (PSS) and a secondary synchronization signal (SSS)) in the network 100 to facilitate synchronization. The BSs 104 can broadcast system information associated with the network 100 (e.g., including a master information block (MIB), remaining minimum system information (RMSI), and other system information (OSI)) to facilitate initial network access.

In an embodiment, a UE 102 attempting to access the network 100 may perform an initial cell search by detecting a PSS from a BS 104. The PSS may enable synchronization of period timing and may indicate a physical layer identity value. The UE 102 may then detect an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. After receiving the PSS and SSS, the UE 102 may receive a MIB from a physical broadcast channel (PBCH). The MIB may include system information for initial network access and scheduling information for RMSI and/or OSI. After decoding the MIB, the UE 102 may RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, physical downlink control channel (PDCCH), physical downlink shared channel (PDSCH), physical sidelink shared channel (PSSCH). For example, a UE 102 may exchange signals and messages using the RACH for initial network access. A UE 102 may transmit UL control information (e.g., scheduling requests, acknowledgements, and/or channel quality reports) and UL data in the PUCCH and the PUSCH, respectively. A BS 104 may transmit DL control information (e.g., UL and DL grants) and DL data in the PDCCH and the PDSCH, respectively. The UEs 102 may communicate with each other in the PSSCH.

In an embodiment, a UE 102 may initiate an initial network access or a random-access procedure by transmitting a random access preamble (e.g., a physical signal including a predetermined sequence with no data bits). When a BS 104 detects the random-access preamble, the BS may respond with a random access response (RAR). The UE 102 may monitor for the RAR in an RAR window (e.g., certain time duration). The UE 102 may configure RAR window based on a transmission time of the random access. Upon detecting the RAR, the UE 102 may transmit a connection request to the BS 104 to establish an RRC connection with the BS 104. The BS 104 may respond with a connection response. In some embodiments, the random-access preamble, the RAR, the connection request, and the connection response may be referred to as Msg 1, Msg 2, Msg 3, and Msg 4, respectively.

After completing the initial network access, the UE 102 and the BS 104 can enter a normal operation stage, where operational data may be exchanged. The BS 104 may assign a UE identifier (ID) to the UE 102 for identifying the UE 102 in the network 100. The data exchange between the BS 104 and the UE 102 during the normal operation may be based on the assigned UE ID.

In an embodiment, a BS 104 may schedule UL and/or DL communications with a UE 102 in units of slots, which may include time-frequency resources spanning a number of subcarriers in frequency and a number of symbols in time, as described in greater detail herein. The network 100 may operate over multiple frequency bands. The network 100 may pre-define a pre-determined transmission numerology for each frequency band. A slot in a particular frequency band may be defined in units of symbols (e.g., OFDM symbols) based on a corresponding predetermined transmission numerology. For example, a slot may have a duration of about 1 milliseconds (ms). A pre-determined numerology may indicate a slot with a subcarrier spacing of about 15 kHz and about 14 OFDM symbols. A signal transmission may use any integer multiples of the tone spacing (e.g., at about 15 kHz, about 30 kHz, or about 60 kHz). Alternatively, a pre-determined numerology may indicate a slot with a subcarrier spacing of about 30 kHz and 7 OFDM symbols. Mechanisms for signaling transmission numerologies are described in greater detail herein.

Figure 2:
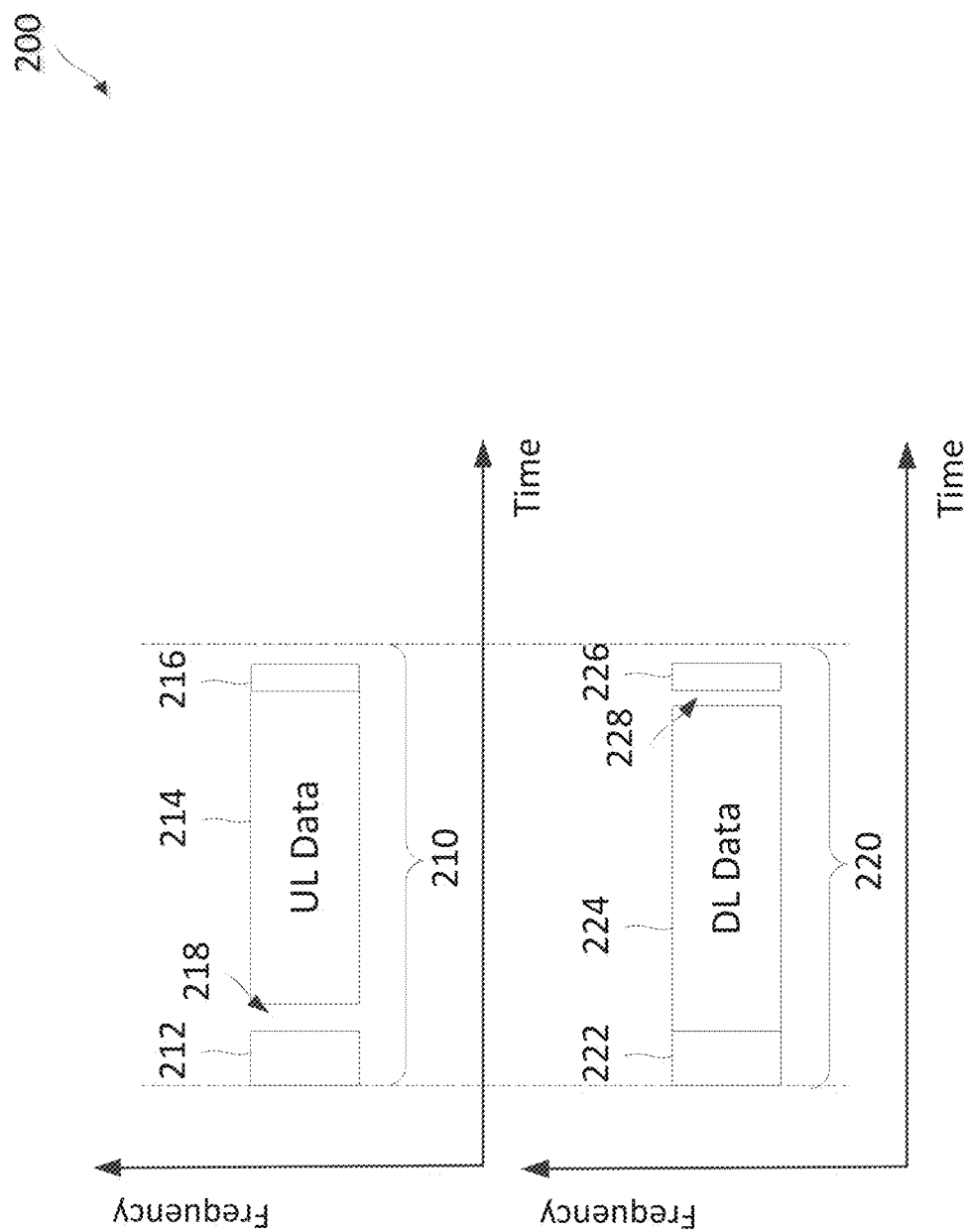
FIG. 2 illustrates a subframe configuration according to embodiments of the present disclosure.

FIG. 2 illustrates a subframe configuration 200 according to embodiments of the present disclosure. The configuration 200 may be employed by the BSs 104 and the UEs 102 for transmission. In FIG. 2, the x-axes represent time in some constant units and the y-axes represent frequency in some constant units. The configuration 200 shows two self-contained subframes 210 and 220. The subframes 210 and 220 can be configured for UL transmission or DL transmission. As an example, the subframe 210 is configured for UL transmission and the subframe 220 is configured for DL transmission. Thus, the subframe 210 may be referred to as a UL-centric subframe and the subframe 220 may be referred to as a DL-centric subframe. The subframe 210 includes a DL control portion 212 for carrying DL control, a UL data portion 214 for carrying UL data, and a UL control portion 216 for carrying UL control. The subframe 220 includes a DL control portion 222 for carrying DL control, a DL data portion 224 for carrying DL data, and a UL control portion 226 for carrying UL control. As shown, the subframe 210 further includes s a guard band 218 between the DL control portion 212 and the UL data portion 214. The subframe 220 further includes s a guard band 228 between the DL data portion 224 and the UL data portion 226. The guard bands 218 and 228 allow for switching between transmit and receive. As shown, the configuration 200 allows for dynamic TDD operations.

Figure 3:
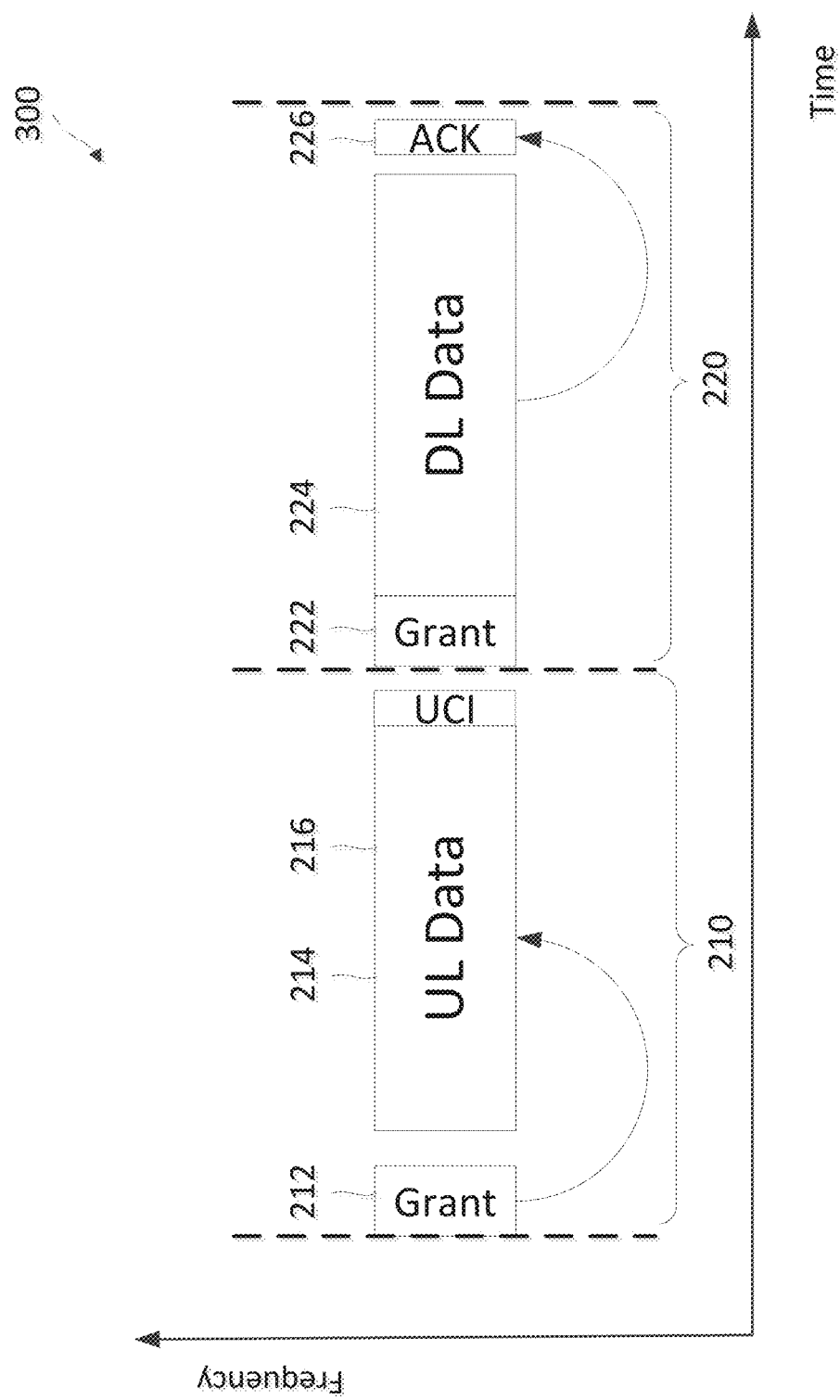
FIG. 3 illustrates a subframe transmission method according to embodiments of the present disclosure.

FIG. 3 illustrates a subframe transmission method 300 according to embodiments of the present disclosure. The method 300 may be employed by the BSs 104 and the UEs 102 for transmission. In FIG. 3, the x-axis represents time in some constant units and the y-axis represents frequency in some constant units. The configuration 300 illustrates the subframes 210 and 220 in operation. For example, a BS may employ the subframe 210 to grant a UE for UL transmission. As shown, the BS may transmit a UL grant in the DL control portion 212 and the UE may transmit UL data in the UL data portion 214 and UL control in the UL control portion 216. The BS may employ the subframe 220 to transmit DL data to the UE. As shown, the BS may transmit a DL grant in the DL control portion 222 and DL data in the DL data portion 224, where the UE may send an acknowledgement to the UE in the UL control portion 216. Thus, the method 300 may allow for modular operation and low latency.

Figure 4:
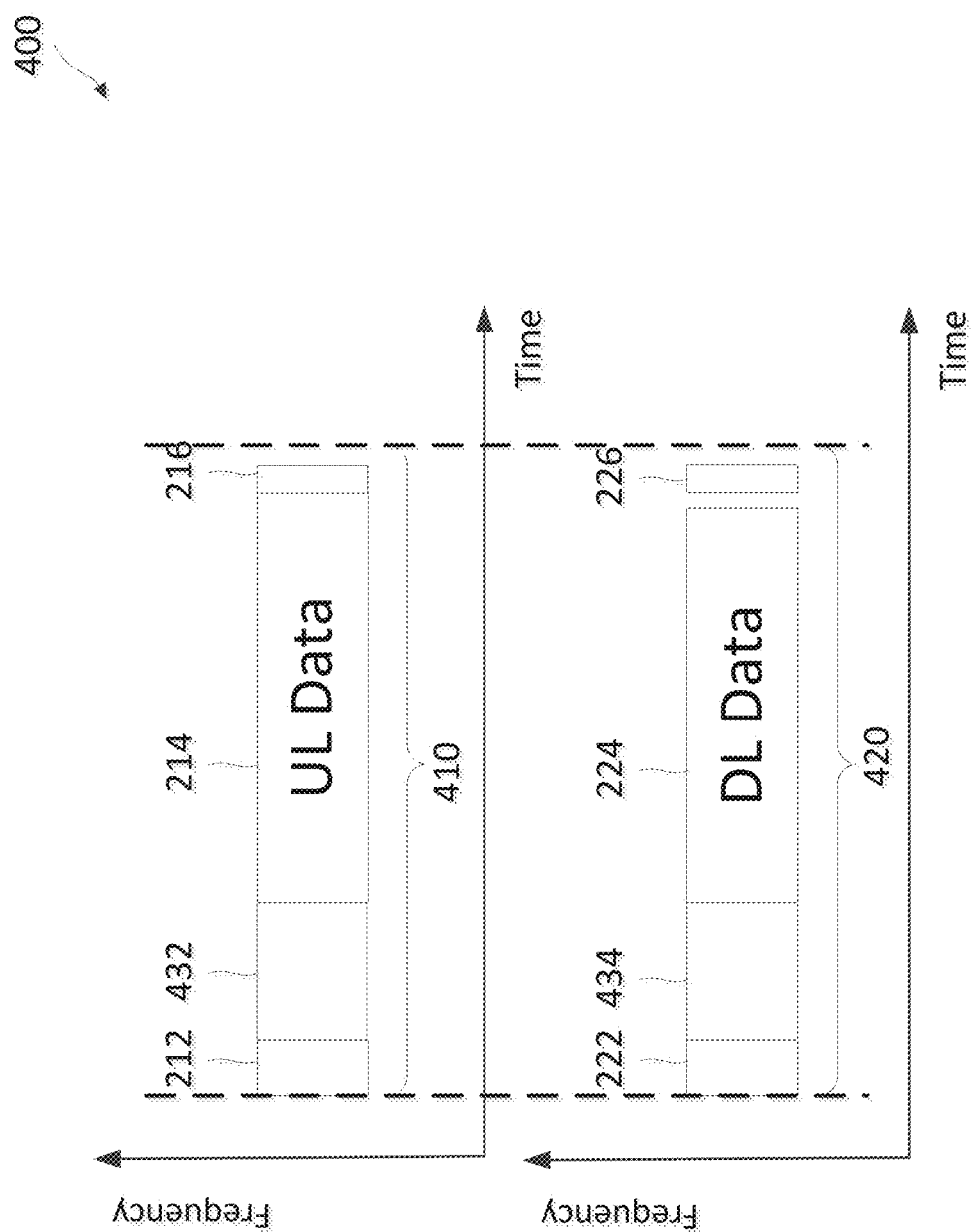
FIG. 4 illustrates a subframe configuration according to embodiments of the present disclosure.

FIG. 4 illustrates a subframe configuration 400 according to embodiments of the present disclosure. The configuration 400 may be employed by the BSs 104 and the UEs 102 for transmission. In FIG. 4, the x-axes represent time in some constant units and the y-axes represent frequency in some constant units. The configuration 400 shows a UL-centric self-contained subframe 410 and a DL-centric self-contained subframe 420. The subframe 410 is similar to the subframe 210, but includes an additional portion 432. Similarly, the subframe 420 is similar to the subframe 220, but includes an additional portion 434. The additional portions 432 and 434 may be used for carrying other signals, which may include control information or data. Thus, the configuration 400 allows for forward compatibility.

Figure 5:
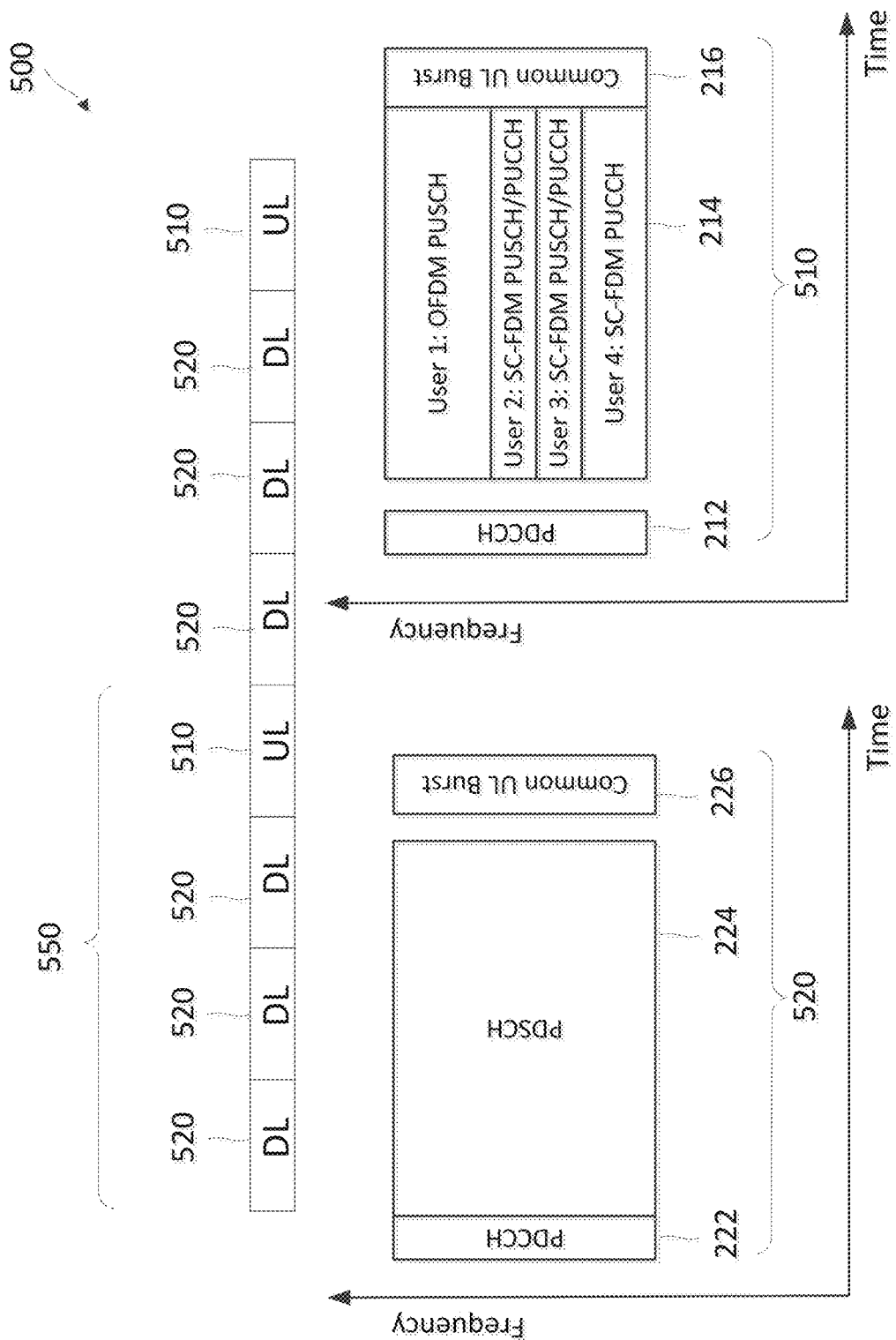
FIG. 5 illustrates a time-division duplexing (TDD) configuration in a macro cell according to embodiments of the disclosure.

FIG. 5 illustrates a TDD configuration 500 in a macro cell according to embodiments of the disclosure. The configuration 500 may be employed by the BSs 104 and the UEs 102 for transmission. In FIG. 5, the x-axes represent time in some constant units and the y-axis represents frequency in some constant units. As shown, a BS and UEs may communicate through a plurality of UL-centric subframes 510 and DL-centric subframes 520. The subframes 510 may be similar to the subframes 210 and 410. The subframes 520 may be similar to the subframes 220 and 420. In an embodiment, a group 550 of the subframes 510 and 520 may span a duration of about 2 milliseconds (ms). In an embodiment, both subframes 510 and 520 may carry OFDM waveforms. In an embodiment, the subframe 510 may optionally carry SC-FDM waveforms, which may provide better link budget for UEs located near or at edges of macro cells.

In the configuration 500, the BS may transmit a physical downlink control channel (PDCCH) signal in a DL control portion 222 of the subframe 520 and a physical downlink shared channel (PDSCH) signal in a DL data portion 224 of the subframe 510. The PDSCH signal may carry DL data. The PDCCH signal may carry DL control information, for example, including DL grants indicating transmission configurations for the PDSCH signal. A UE may transmit a UL common burst in the UL control portion 226 of the subframe 520. The UL common bursts may include UL control information, for example, including channel quality reports and/or scheduling requests.

Similarly, the BS may transmit a PDCCH in a DL control portion 212 of the subframe 510. The UE may transmit a UL data in the UL data portion 214 of the subframe 510 and a UL common burst in the UL control portion 216 of the subframe 510. In an embodiment, both subframes 510 and 520 may carry OFDM waveforms. In an embodiment, the subframe 510 may optionally carry SC-FDM waveforms, which may provide better link budget for edge UE in macro cells. Cell edge UEs may not use the transmit UL common burst for PUSCH.

The subframes 210, 220, 410, 420, 510, and 520 can be divided into slots and/or mini-slots to define shorter durations for UL and/or DL transmission, as described in greater detail herein.

Figure 6:
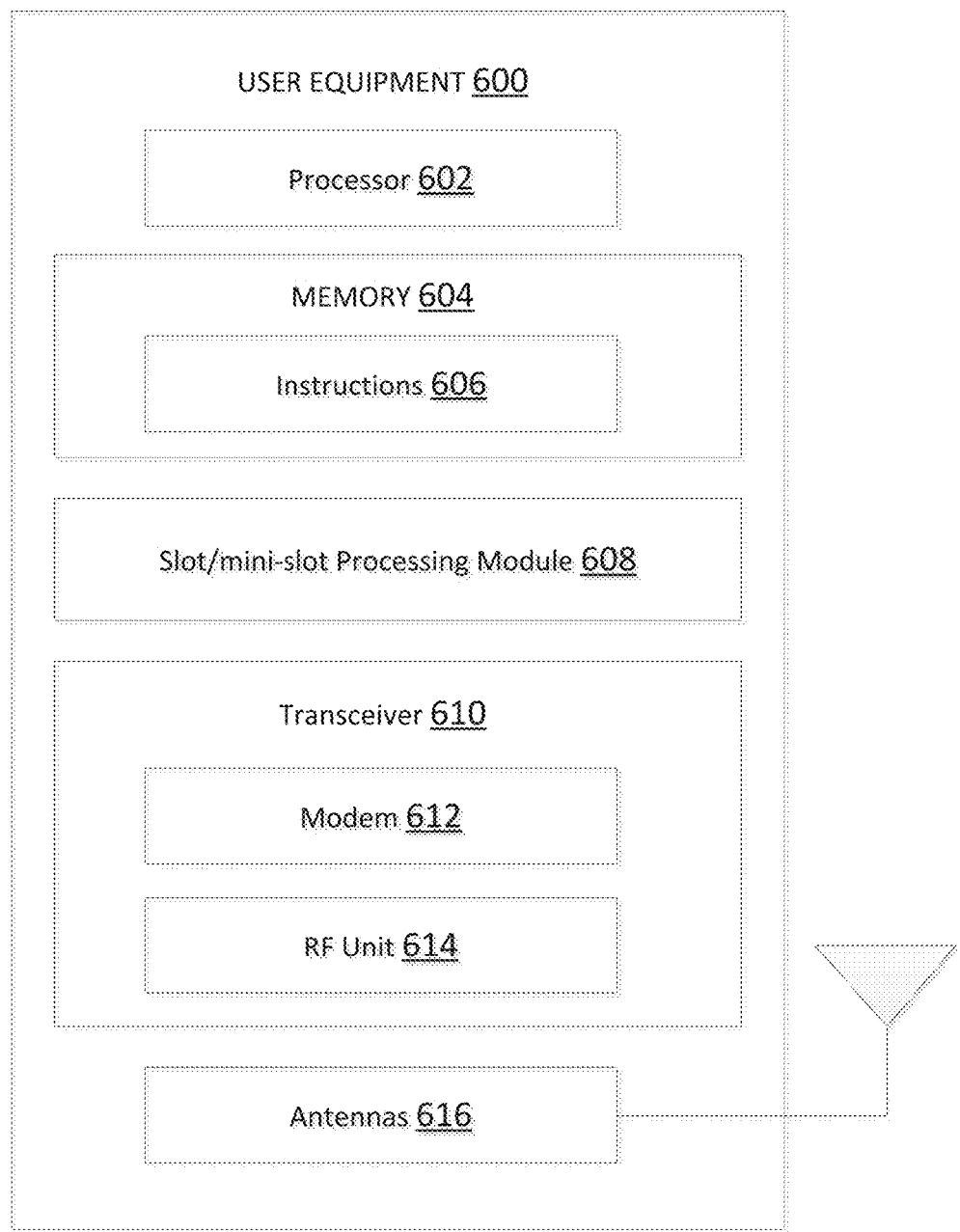
FIG. 6 is a block diagram of an exemplary user equipment (UE) according to embodiments of the present disclosure.

FIG. 6 is a block diagram of an exemplary UE 600 according to embodiments of the present disclosure. The UE 600 may be a UE 102 as discussed above. As shown, the UE 600 may include a processor 602, a memory 604, a slot/mini-slot processing module 608, a transceiver 610 including a modem subsystem 612 and a RF unit 614, and an antenna 616. These elements may be in direct or indirect communication with each other, for example via one or more buses.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 102 in connection with embodiments of the present disclosure. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The slot/mini-slot processing module 608 may be implemented via hardware, software, or combinations thereof. For example, the slot/mini-slot processing module 608 may be implemented as a processor, circuit, and/or instructions 606 stored in the memory 604 and executed by the processor 602. The slot/mini-slot processing module 608 may be used for various aspects of the present disclosure. For example, the slot/mini-slot processing module 608 is configured to receive configuration information associated with slot/mini-slot structures and/or transmission numerologies and communicate with a BS (e.g., the BSs 104) based on the received configuration information, as described in greater detail herein.

As shown, the transceiver 610 may include the modem subsystem 612 and the RF unit 614. The transceiver 610 can be configured to communicate bi-directionally with other devices, such as the BSs 104. The modem subsystem 612 may be configured to modulate and/or encode the data from the memory 604 and/or the slot/mini-slot processing module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 102 or a BS 104. Although shown as integrated together in transceiver 610, the modem subsystem 612 and the RF unit 614 may be separate devices that are coupled together at the UE 102 to enable the UE 102 to communicate with other devices.

The RF unit 614 may provide the modulated and/or processed data, e.g. data packets (or, more generally, data messages that may contain one or more data packets and other information), to the antenna 616 for transmission to one or more other devices. The antenna 616 may further receive data messages transmitted from other devices. This may include, for example, reception of signals based on slot/mini-slot structures according to embodiments of the present disclosure. The antenna 616 may provide the received data messages for processing and/or demodulation at the transceiver 610. Although FIG. 6 illustrates antenna 616 as a single antenna, antenna 616 may include multiple antennas of similar or different designs in order to sustain multiple transmission links. The RF unit 614 may configure the antenna 616

Figure 7:
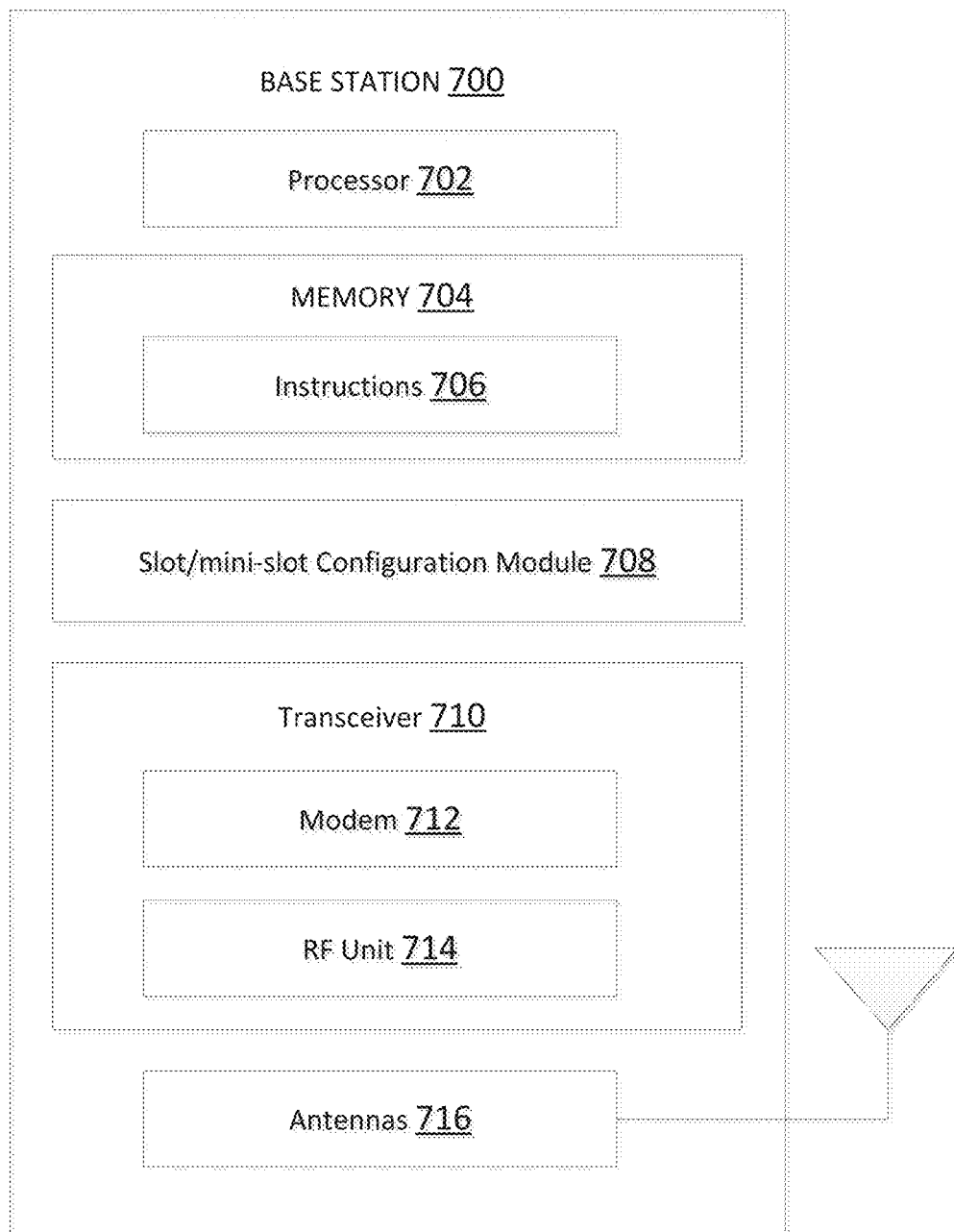
FIG. 7 is a block diagram of an exemplary base station (BS) according to embodiments of the present disclosure.

FIG. 7 is a block diagram of an exemplary BS 700 according to embodiments of the present disclosure. The BS 700 may be a BS 104 as discussed above. As shown, the BS 700 may include a processor 702, a memory 704, a slot/mini-slot configuration module 708, a transceiver 710 including a modem subsystem 712 and a RF unit 714, and an antenna 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 6.

The slot/mini-slot configuration module 708 may be implemented via hardware, software, or combinations thereof. For example, the slot/mini-slot configuration module 708 may be implemented as a processor, circuit, and/or instructions 706 stored in the memory 704 and executed by the processor 702. The slot/mini-slot configuration module 708 may be used for various aspects of the present disclosure. For example, the slot/mini-slot configuration module 708 may configure and signal slot/mini-slot structures and/or transmission numerologies, as described in greater detail herein.

As shown, the transceiver 710 may include the modem subsystem 712 and the RF unit 714. The transceiver 710 can be configured to communicate bi-directionally with other devices, such as the UEs 102 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 102. Although shown as integrated together in transceiver 710, the modem subsystem 712 and the RF unit 714 may be separate devices that are coupled together at the BS 104 to enable the BS 104 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of information to complete attachment to a network and communication with a camped UE 102 according to embodiments of the present disclosure. The antenna 716 may further receive data messages transmitted from other devices and provide the received data messages for processing and/or demodulation at the transceiver 710. Although FIG. 7 illustrates antenna 716 as a single antenna, antenna 716 may include multiple antennas of similar or different designs in order to sustain multiple transmission links.

Figure 8:
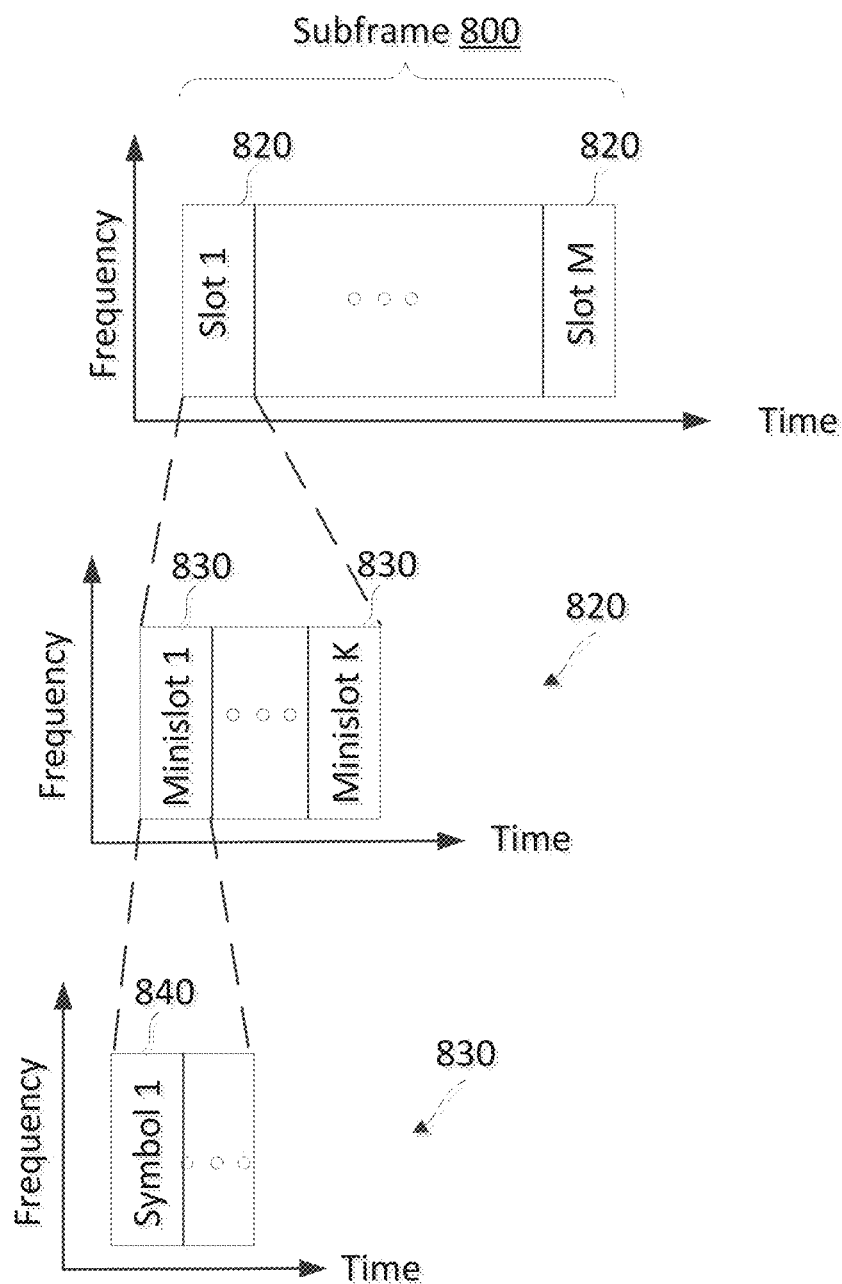
FIG. 8 illustrates a self-contained subframe according to embodiments of the present disclosure.

FIG. 8 illustrates a self-contained subframe 800 according to embodiments of the present disclosure. The subframe 800 may be employed by BSs 104 and 700 and UEs 102 and 600. In FIG. 8, the x-axes represent time in some constant units and the y-axes represent frequency in some constant units. The subframe 800 may be similar to the subframes 210, 220, 410, 420, 510, and 520. The subframe 800 includes M plurality of slots 820. Each slot 820 includes K plurality of mini-slots 830. Each mini-slot 830 may include 1, 2, 3, or 7 symbols.

In an embodiment, numerologies for the slots 820 and/or the mini-slots 830 may be scalable. Some examples of numerologies may include a transmission time interval (TTI), a number of symbols per ms, a tone spacing, a signal portion duration, a symbol duration, a cyclic prefix (CP) overhead, a carrier bandwidth, and a number of active subcarriers (e.g., tones). The following table shows some examples of scalable numerologies under different scenarios, such as in a rural area, a urban microcell (UMi), a urban macrocell (UMa), and an indoor area:

TABLE 1

Scalable Numerologies

|  | Rural (large cell) | UMa & UMi | Small Cell | Indoor/ mmWave (28 GHz) |
| --- | --- | --- | --- | --- |
| SC Multiples | 1 | 2 | 4 | 8 |
| TTI (microseconds) | 500.00 | 500.00 | 250 | 125.00 |
| Number of symbols/1 millisecond | 14 | 28 | 56 | 112 |
| Tone spacing (kHz) | 15 | 30 | 60 | 120 |
| Signal portion (microseconds) | 66.67 | 33.33 | 16.67 | 8.33 |
| Symbol duration (microseconds) | 71.4 | 35.7 | 17.9 | 8.9 |
| CP Overhead (%) | 6.67% | 6.67% | 6.67% | 6.67% |
| Carrier Bandwidth (MHz) | 20 | 80/100 | 80 | 80/100 |
| Number of Active Subcarriers | 1200 | 2400/3000 | 1200 | 600/900 |

In an embodiment, the subframe 800 may include x number of OFDM symbols 840 with a normal CP in a reference numerology (e.g., tone spacing), where x is a positive integer. The reference numerology may be pre-determined, for example, defined in a standard specification. A BS may signal a parameter y, where y may be equaled to x or (e.g., y=x) or a factor of x (e.g., y=x/2). A slot 820 may be defined with a duration of y OFDM symbols 840. An integer number of slots 820 may fit into the duration of the subframe 800, for example, at least for a tone spacing greater than or equal to the reference numerology. In one embodiment, the structure of a slot 820 may include a control portion (e.g., the DL control portions 212 and 222) at the beginning of the slot 820. In another embodiment, the structure of a slot 820 may include a control portion (e.g., the UL portions 216 and 226) at the end of the slot 820. In another embodiment, the structure of a slot 820 may include a control portion (e.g., the DL control portions 212 and 222) at the beginning of the slot 820 and another control portion (e.g., the UL control portions 216 and 226) at the end of the slot 820. A slot 820 may represent a scheduling unit.

A mini-slot 830 may at least support transmission shorter than y OFDM symbols in the numerology used for transmission. A mini-slot 830 may include a control portion at the beginning and/or end of the mini-slot 830. The smallest mini-slot 830 is a smallest allowable scheduling unit, which may include 1, 2, 3, or 7 symbols 840.

In an embodiment, a network may employ different tone spacings for different channel signals. As an example, a PSS, an SSS, and a PBCH signal may be transmitted with a 15 kHz tone spacing. A BS may transmit the PSS and SSS and a UE may synchronize to the BS based on the PSS and SSS. A BS may transmit transmission control information (e.g., UL and DL grants) in a PDCCH and transmit DL data in a PDSCH based on the DL grants indicated in the PDCCH. A PDCCH may be transmitted with a 60 kHz spacing. A PDSCH may be transmitted with a 30 kHz tone spacing. A UE may transmit UL data based on UL to a BS in a PUSCH based on UL grants indicated in a PDCCH and transmit UL control information (e.g., channel reports, acknowledgements, and/or scheduling requests) in a PUCCH. A PUSCH may be transmitted with a 30 kHz tone spacing. A PUCCH may be transmitted with a 60 kHz tone spacing. When different channels have different numerologies and the channels are transmitted in a slot 820 or a mini-slot 830, the signaling of the structures of slots 820, the mini-slots 830, and the different channels are important for communications between BSs and UEs.

Figure 9:
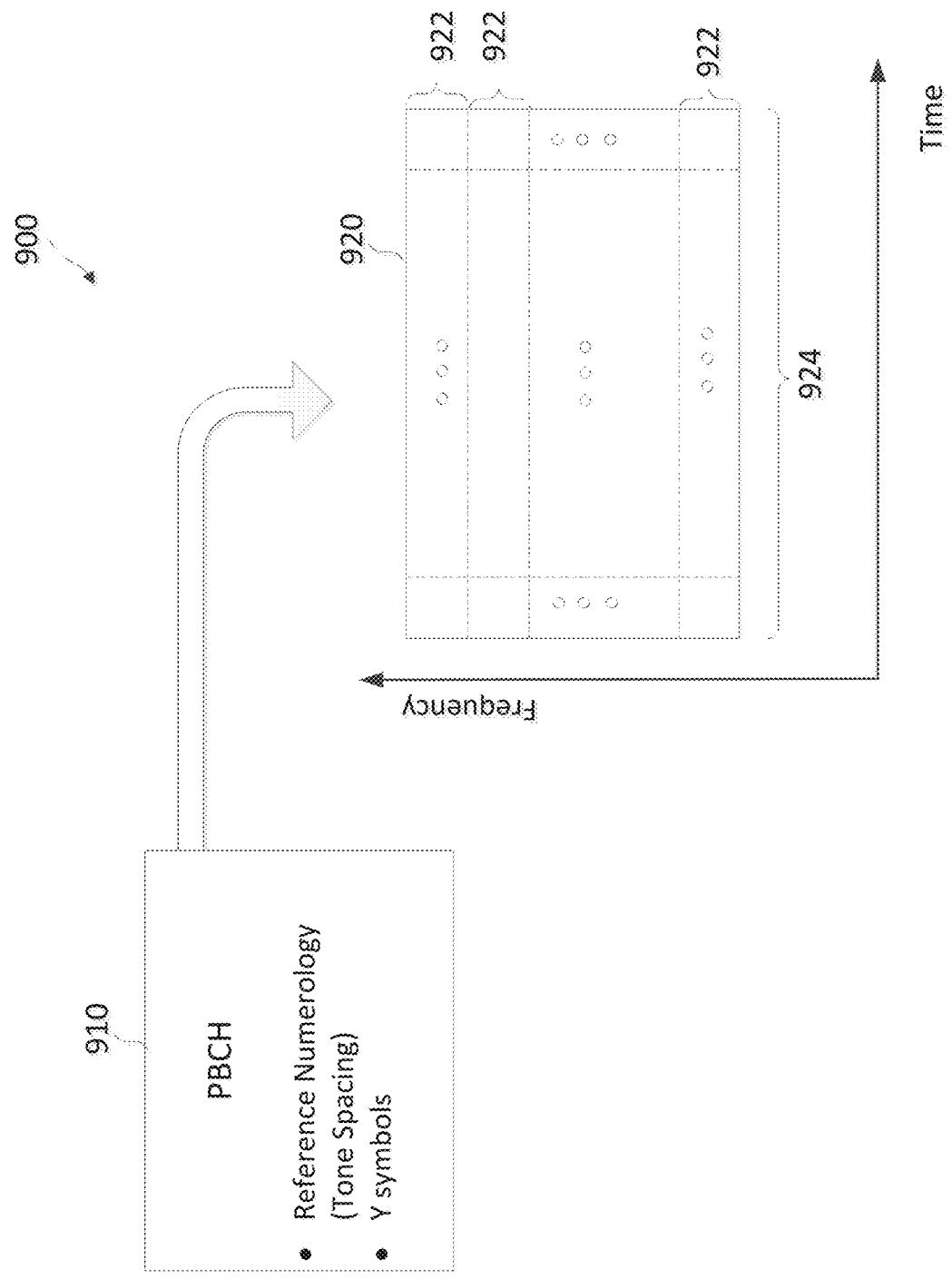
FIG. 9 illustrates a slot/mini-slot signaling method according to embodiments of the disclosure.

FIG. 9 illustrates a slot/mini-slot signaling method 900 according to embodiments of the disclosure. The method 900 may be employed by BSs such as the BSs 104 and 700 and UEs such as the UEs 102 and 600 in a network such as the network 100. In FIG. 9, the x-axes represent time in some constant units and the y-axes represent frequency in some constant units. In the method 900, a BS may signal a structure for a slot 920 (e.g., the slots 820) in a PBCH 910. The communications may be in the form of slots, which may include uplink and/or downlink transmissions. Scheduling may be in units of slots. The network may pre-define a reference transmission numerology for each frequency band. A slot in a particular frequency band may be defined in units of OFDM symbols based on corresponding reference transmission numerology.

The slot 920 structure may be used by all channels. For example, the BS may indicate a reference numerology (e.g., a tone spacing 922) of the slot 920 and a duration 924 (e.g., Y number of symbols) in the slot 920. However, the structure of the slot 920 may be decoupled from a transmission numerology. For example, the slot 920 may have 7 symbols with a tone spacing of 30 kHz. The transmissions of a PDCCH, a PDSCH, PUSCH, and/or PUCCH may use a different numerology, for example, a tone spacing of 60 kHz. It should be noted that the BS may transmit the PBCH according to a reference numerology and may span one or more slots, which may be the same or different from the slot 920. The reference numerology and the duration (e.g., number of slots) of the PBCH 910 may be pre-determined and known to UEs (e.g., UEs 102). For example, in a 2 gigahertz (GHz) band, a BS may transmit the PBCH 910 in 7 symbols with a tone spacing of 30 kHz. Alternatively, in a 30 GHz band, a BS may transmit the PBCH 910 in 14 symbols with a tone spacing of 120 kHz.

Figure 10:
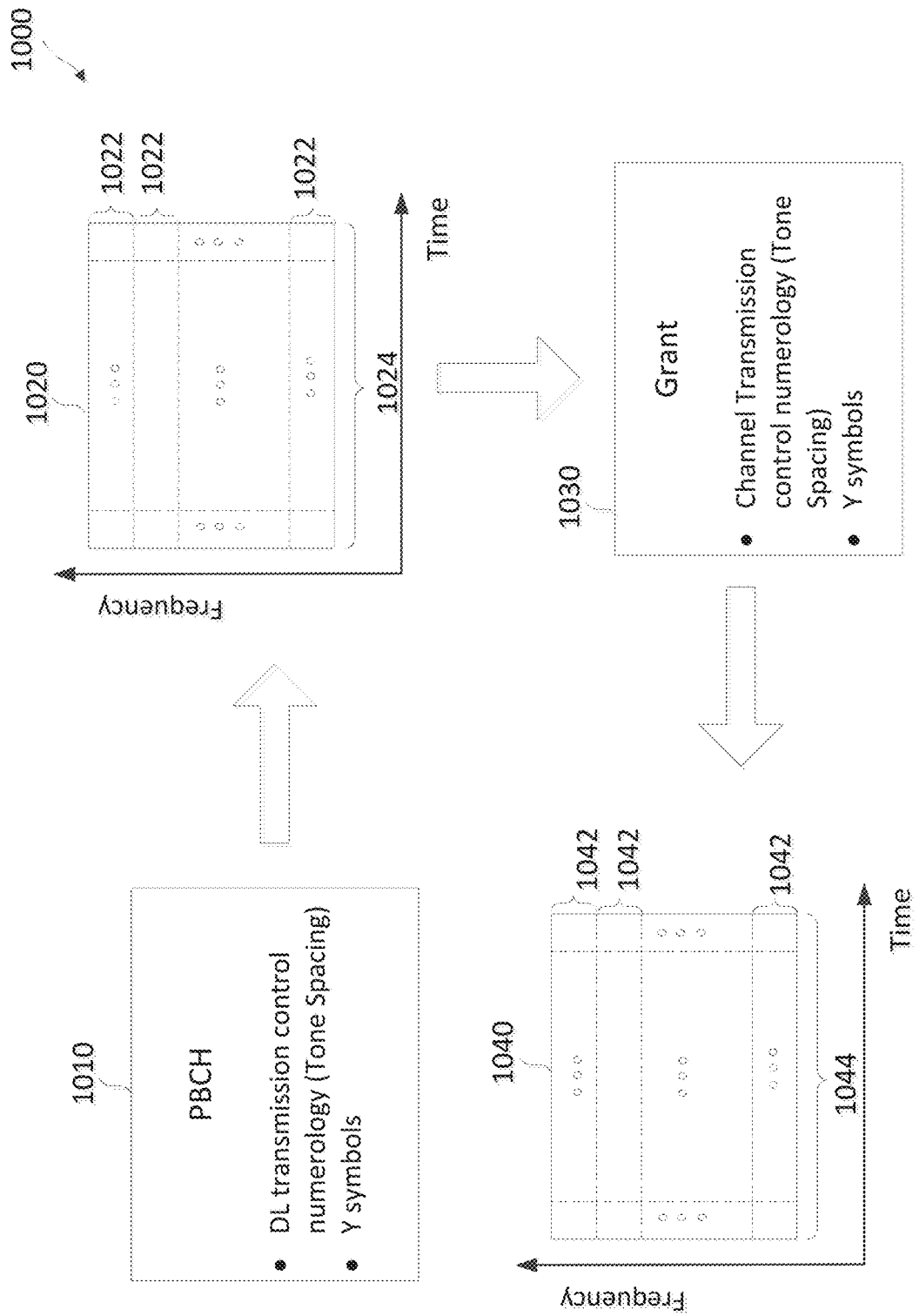
FIG. 10 illustrates a slot/mini-slot signaling method according to embodiments of the disclosure.

FIG. 10 illustrates a slot/mini-slot signaling method 1000 according to embodiments of the disclosure. The method 1000 may be employed by BSs such as the BSs 104 and 700 and UEs such as the UEs 102 and 600 in a network such as the network 100. In FIG. 10, the x-axes represent time in some constant units and the y-axes represent frequency in some constant units. In the method 1000, a BS may signal a structure for a slot 1020 (e.g., the slots 820 and 920) in a PBCH 1010. The PBCH 1010 may be transmitted according to a pre-determined reference numerology known to UEs (e.g., UEs 102). The slot 1020 structure may be used for DL control transmission. The slot 1020 structure may be defined with a DL control transmission numerology (e.g., a tone spacing 1022 and a duration 1024 in terms of number of symbols), which may be the same or different from the reference numerology.

The BS may signal a structure for a slot 1040 in a grant 1030. The grant 1030 may be transmitted according to the numerology of the slot 1020 structure. The slot 1040 structure may be used for a channel signal transmission. The slot 1040 structure may be defined with a channel transmission numerology (e.g., a tone spacing 1042 and a duration 1044 in terms of number of symbols). FIG. 11 is a table 1100 illustrating examples for defining numerologies for various channels according to embodiments of the disclosure. The table 1100 shows numerology defining mechanisms when using the method 1000. The column 1110 shows the data payloads carried by the physical channels listed in the column 1130. The column 1120 shows the grant or signaling that lead to the transmission of the physical channel in the column 1130. The column 1140 shows the channels that define the slot structure reference numerology for the transmission of the physical channels listed in the column 1130.

Figure 12:
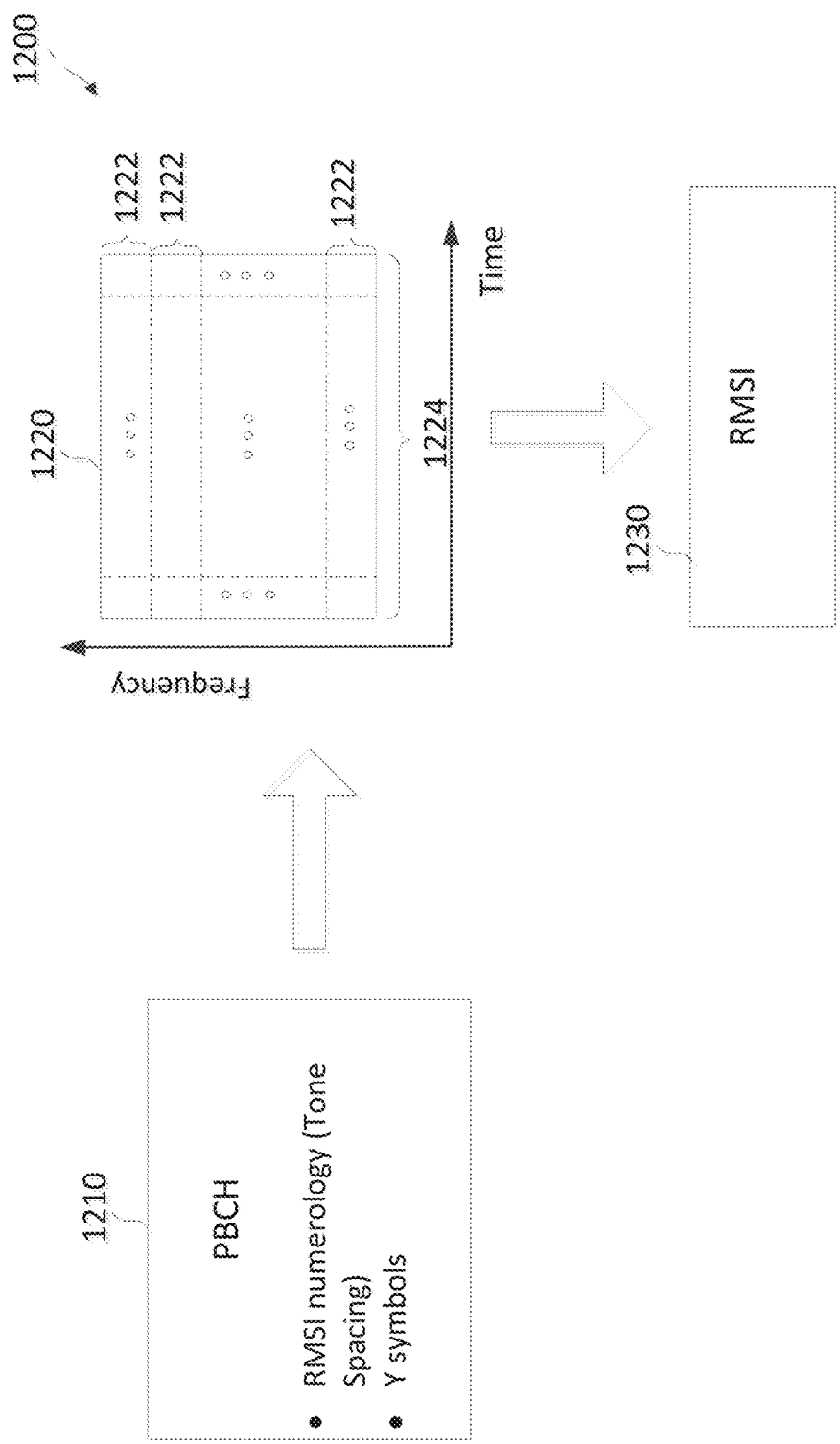
FIG. 12 illustrates a slot/mini-slot signaling method according to embodiments of the disclosure.

FIG. 12 illustrates a slot/mini-slot signaling method 1200 according to embodiments of the disclosure. The method 1200 may be employed by BSs such as the BSs 104 and 700 and UEs such as the UEs 102 and 600 in a network such as the network 100. In FIG. 12, the x-axes represent time in some constant units and the y-axes represent frequency in some constant units. The method 1200 may be used to signal numerologies as shown in the table 1100. In some embodiments, the method 1200 may be used in conjunction with the methods 900 and/or 1000.

In the method 1200, a BS may transmit a PBCH 1210 signal according to a pre-determined numerology known to UEs (e.g., UEs 102 and 600) in the network. In an embodiment, the pre-determined numerology may be defined in a specification for a communication protocol used by the network. The specification may define a numerology (e.g., tone spacing) and a slot structure (e.g., number of symbols) based on the numerology for each frequency band. For example, the specification may specify a tone spacing of 30 kHz and a slot structure with 7 OFDM symbols based on the tone spacing of 30 kHz. The BS may transmit synchronization signals (e.g., PSS and SSS) in a particular frequency band using the pre-determined numerology defined for the particular frequency band.

The PBCH 1210 may carry system information signals. The PBCH 1210 may include a payload including a master information block (MIB). The MIB may include system information for initial network access. The MIB may indicate a RMSI numerology or a structure for a slot 1220 (e.g., the slots 820, 920, and 1020), for example, including a tone spacing 1222 and a duration 1224 in terms of number of symbols. The BS may transmit RMSI 1230 using the RMSI numerology. The RMSI numerology may also be used for transmissions in new radio-physical downlink shared channel (NR-PDSCH) and new radio-physical downlink control channel (NR-PDCCH). The RMSI numerology may be the same as the pre-determined numerology (e.g., used for transmitting the PBCH 1210) or may be different from the pre-determined numerology. The RMSI 1230 may include random access channel (RACH) configurations, for example, for a BS and a UE to exchange Msg 2 and Msg 4 as described above with respect to FIG. 1.

In an embodiment, Msg 2 and/or Msg 4 are transmitted using the RMSI numerology (e.g., the slot 1220 structure). In an embodiment, after the initial network access, the UE may be configured with one or more bandwidth parts (e.g., frequency bands). Each bandwidth part may include a numerology (e.g., including a slot), a physical resource block (PRB) grid to index mapping, a control resource set (CORESET) numerology. A PRB grid may include a number of subcarriers in frequency and a number of symbols in time. The CORESET may indicate DL control information (DCI) (e.g., carried in a PDCCH or the DL control portions 212 and 222). DCI may indicate which of the configured BWPs may be used (e.g., activate or deactivate) for DL data transmissions (e.g., in a PDSCH or the DL data portions 224).

In an embodiment, a single DL numerology may be used for at least transmissions of RMSI, Msgs 2 and 4, and OSI. In an embodiment, at least for an initial network access, an RAR is carried in the NR-PDSCH scheduled by the NR-PDCCH. For example, the NR-PDCCH may carry a CORE- SET indicating a schedule for the RAR, where the CORESET may be indicated in the RACH configuration. The configuration for the CORESET indicated in the RACH configuration may be the same as a CORESET configuration indicated in the PBCH 1210 or different the from CORESET configuration indicated in the PBCH 1210. In an embodiment, for a single Msg 1 RACH transmission, a corresponding RAR window starts from the first available CORESET after a fixed duration from the end of the Msg 1 transmission. The fixed duration may be defined in units of seconds and may be applied to all RACH occasions (e.g., random access tries or attempts). In an embodiment, for a single Msg 1 RACH transmission, the size or the duration of the RAR window may be the same for all RACH occasions. The RAR size and/or the RAR starting time may be indicated in RMSI. An RAR window may accommodate or consider processing time at a gNB (e.g., the BSs 104). For example, the maximum RAR window size may be dependent on the worst case gNB delay after an Msg 1 reception at the gNB. The delay may include processing delay (e.g., for processing the Msg 1) and/or scheduling delay (e.g., for scheduling Msg 2) at the gNB. The minimum RAR window size may be dependent on the duration of Msg 2, the duration of the CORESET, or the scheduling delay (e.g., for scheduling Msg 2).

In an embodiment, in a contention-based random access procedure, the subcarrier spacing (SCS) (e.g., the tone spacing) for Msg 1 is configured in the RACH configuration. The SCS for Msg 2 is the same as the numerology for the RMSI. The SCS for Msg 3 is configured in the RACH configuration separately from the SCS for Msg 1. The SCS for Msg 4 is the same as the SCS for Msg 2. For a contention-free random access procedure for handover, the SCS for Msg 1 and the SCS for Msg 2 are provided in the handover command.

In an embodiment, there is an initial active DL/UL bandwidth part pair valid for a UE until the UE is explicitly configured or reconfigured with one or more bandwidth parts during or after an RRC connection (e.g., the exchanges of Msg 3 and 4) is established. The initial active DL/UL bandwidth part is confined within the UE minimum bandwidth for the given frequency band. Support for activation/deactivation of DL and UL bandwidth part may be by an explicit indication at least in DCI. Support for activation/deactivation of DL and UL bandwidth part may be by means of a timer. A timer can enable a UE to switch the UE's active DL bandwidth part to or from a default bandwidth part. The default bandwidth part can be the initial active DL bandwidth part defined above.

Figure 13:
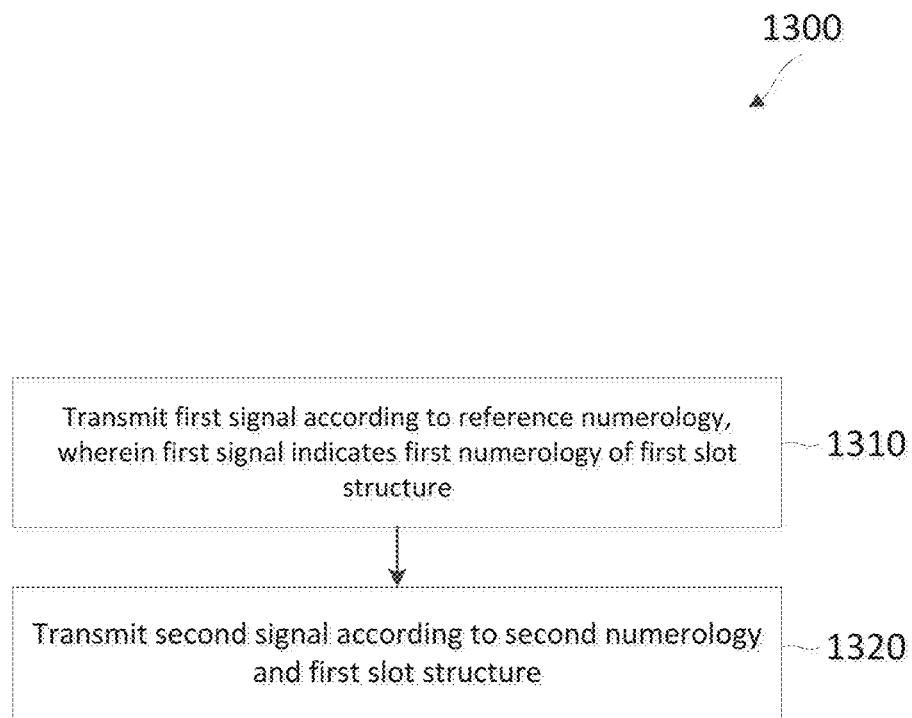
FIG. 13 is a flow diagram of a method of slot/mini-slot structure signaling according to embodiments of the present disclosure.

FIG. 13 is a flow diagram of a method 1300 of slot/mini-slot structure signaling according to embodiments of the present disclosure. Steps of the method 1300 can be executed by a computing device (e.g., a processor, processing circuit, and/or other suitable component) of a wireless communication device, such as the BSs 104 and 700. The method 1300 may employ similar mechanisms as described with respect to the network 100 and the methods 900, 1000, and 1200. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting a first signal (e.g., the PBCHs 910, 1010, and 1210) according to a reference numerology. The first signal can be configured to indicate a first numerology of a first slot structure (e.g., the slots 920, 1020, and 1220). The first numerology may be any of the parameters shown in Table 1.

At step 1320, the method 1300 includes transmitting a second signal according to a second numerology and the first slot structure. When employing the method 900, the second signal may be any channel signal. When employing the method 1000, the second signal may be the grant 1030. When employing the method 1200, the second signal may be the RMSI, the NR-PDSCH signal, and/or the NR-PDCCH signal.

Accordingly, in some instances, a first wireless communication device transmits a first signal (e.g., the PBCH signals 910, 1010, and 1210) according to a first numerology (e.g., a pre-determined slot structure) including at least a first tone spacing (e.g., a pre-determined tone spacing). The first signal can be configured to indicate a second numerology (e.g., structures of the slots 920, 1020, and 1220) including at least a second tone spacing (e.g., the tone spacing 922, 1022, and 1222). The first wireless communication device transmits a second signal according to the second numerology. The second numerology may be independent from the first numerology (i.e., unrelated, mixed, and/or of different size, shape, and/or frequency).

Figure 14:
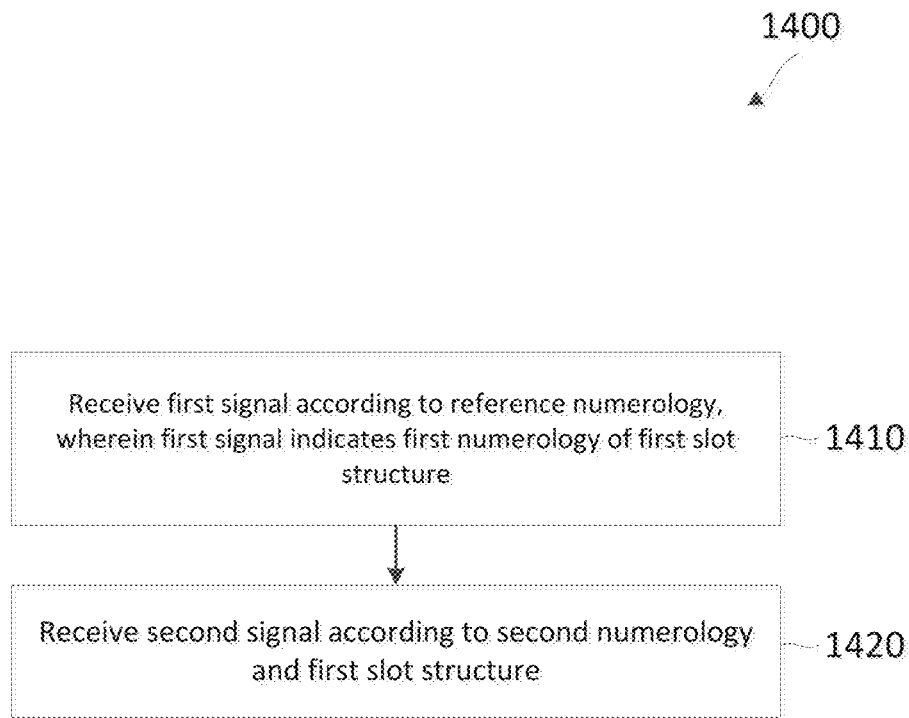
FIG. 14 is a flow diagram of a method of signal reception based on slot/mini-slot structures according to embodiments of the present disclosure.

FIG. 14 is a flow diagram of a method 1400 of signal reception based on slot/mini-slot structures according to embodiments of the present disclosure. Steps of the method 1400 can be executed by a computing device (e.g., a processor, processing circuit, and/or other suitable component) of a wireless communication device, such as the UEs 102 and 600. The method 1400 may employ similar mechanisms as described with respect to the network 100 and the methods 900, 1000, and 1200. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving a first signal (e.g., the PBCHs 910 and 1010) according to a reference numerology, wherein the first signal indicates a first numerology of a first slot structure (e.g., the slots 920, 1020, and 1220). The first numerology may be any of the parameters shown in Table 1.

At step 1420, the method 1400 includes receiving a second signal according to a second numerology and the first slot structure. When employing the method 900, the second signal may be any channel signal. When employing the method 1000, the second signal may be the grant 1030. When employing the method 1200, the second signal may be the RMSI, the NR-PDSCH signal, and/or the NR-PDCCH signal.

Accordingly, in some instances, a first wireless communication device receives a first signal (e.g., the PBCH signals 910, 1010, and 1210) according to a first numerology (e.g., a pre-determined slot structure) including at least a first tone spacing (e.g., a pre-determined tone spacing), wherein the first signal indicates a second numerology (e.g., the structures of the slots 920, 1020, and 1220) including at least a second tone spacing (e.g., the tone spacing 922, 1022, and 1222). The first wireless communication device receives a second signal according to the second numerology. The second numerology may be independent from the first numerology.

In an embodiment, referring to the methods 1300 and 1400, the second signal may carry a channel signal (e.g., in a PBCH, a PDCCH, a PDSCH, an NR-PDCCH, or an NR-PDCCH). In an embodiment, the second signal includes a transmission grant (e.g., the transmission grant 1030) indicating a third numerology. The first wireless communication device may communicate a third signal with the second wireless communication device according to the third numerology.

In an embodiment, referring to the methods 1300 and 1400, the first signal includes first system information (e.g., a MIB) and the second signal in the methods 1300 and 1400 includes second system information (e.g., RMSI or OSI). The first wireless communication device may communicate, with the second wireless communication device, a random access preamble (e.g., Msg 1 for an initial network access). In response to the random access preamble, the first wireless communication device may communicate, with the second wireless communication device, a random access response (e.g., Msg 2) according to the second numerology. The first wireless communication device may communicate, with the second wireless communication device, a connection request (e.g., Msg 3). In response to the connection request, the first wireless communication device may communicate, with the second wireless communication device, a connection response (e.g., Msg 4) according to the second numerology. Subsequently, the first wireless communication device may communicate, with the second wireless communication device, a configuration indicating one or more numerologies (e.g., for one or more bandwidth parts). The first wireless communication device may communicate, with the second wireless communication device, a selection indicating one of the one or more numerologies. The first wireless communication device may communicate, with the second wireless communication device, a third signal (e.g., a data signal) according to the selected numerology or bandwidth part.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a method of wireless communication, comprising transmitting, by a wireless communication device, a first signal according to a reference transmission numerology, wherein the first signal indicates a first transmission numerology of a first slot structure; and transmitting, by the wireless communication device, a second signal according to a second numerology and the first slot structure.

The method further includes wherein the first signal is a physical broadcast channel (PBCH) signal. The method further includes wherein the first numerology and the second numerology are different. The method further includes wherein the first numerology is identical to the second numerology, wherein the second signal carries a transmission grant indicating a third numerology for a second slot structure, and wherein the method further comprises transmitting, by the wireless communication device, a third signal according to the third numerology and the second slot structure. The method further includes wherein the first numerology includes at least one of a tone spacing or a number of symbols in a slot.

Embodiments of the present disclosure further include a method of wireless communication, comprising receiving, by a wireless communication device, a first signal according to a reference numerology, wherein the first signal indicates a first numerology of a first slot structure; and receiving, by the wireless communication device, a second signal according to a second numerology and the first slot structure.

The method further includes wherein the first signal is a physical broadcast channel (PBCH) signal. The method further includes wherein the first numerology and the second numerology are different. The method further includes wherein the first numerology is identical to the second numerology, wherein the second signal carries a transmission grant indicating a third numerology for a second slot structure, and wherein the method further comprises receiving, by the wireless communication device, a third signal according to the third numerology and the second slot structure. The method further includes wherein the first numerology includes at least one of a tone spacing or a number of symbols in a slot.

Embodiments of the present disclosure further include an apparatus comprising a transceiver configured to transmit a first signal according to a first numerology including at least a first tone spacing, wherein the first signal indicates a second numerology including at least a second tone spacing; and transmit a second signal according to the second numerology.

The apparatus further includes wherein the first signal includes a physical broadcast channel (PBCH) signal, and wherein the second numerology is independent from the first numerology. The apparatus further includes a processor configured to configure the second numerology to indicate a different numerology than the first numerology. The apparatus further includes wherein the second signal includes a transmission grant indicating a third numerology, and wherein the transceiver is further configured to transmit a third signal according to the third numerology. The apparatus further includes wherein the first signal includes first system information associated with a network, and wherein the second signal includes second system information associated with the network. The apparatus further includes wherein the transceiver is further configured to receive, from a second wireless communication device, a request for initial network access; and transmit, to the second wireless communication device in response to the request, a response according to the second numerology. The apparatus further includes wherein the transceiver is further configured to transmit, to a second wireless communication device, a configuration indicating one or more third numerologies; transmit, to the second wireless communication device, a third signal indicating a selection of one of the one or more third numerologies; and communicate, with the second wireless communication device based on the selection. The apparatus further includes wherein the first numerology further includes a number of symbols in a first slot based on the first tone spacing, and wherein the second numerology includes a number symbols in a second slot based on the second tone spacing.

Embodiments of the present disclosure further include an apparatus comprising a transceiver configured to receive a first signal according to a first numerology including at least a first tone spacing, wherein the first signal indicates a second numerology including at least a second tone spacing; and receive a second signal according to the second numerology.

The apparatus further include wherein the first signal includes a physical broadcast channel (PBCH) signal and wherein the second numerology is independent from the first numerology. The apparatus further include wherein the first numerology and the second numerology are different. The apparatus further include wherein the second signal includes a transmission grant indicating a third numerology, and wherein the transceiver is further configured to receive a third signal according to the third numerology. The apparatus further include wherein the first signal includes first system information associated with a network, and wherein the second signal includes second system information associated with the network. The apparatus further include wherein the transceiver is further configured to transmit, to a second wireless communication device, a request for initial network access; and receive, from the second wireless communication device in response to the request, a response according to the second numerology. The apparatus further include wherein the transceiver is further configured to receive, from a second wireless communication device, a configuration indicating one or more third numerologies; receive, from the second wireless communication device, a third signal indicating a selection of one of the one or more third numerologies; and communicate, with the second wireless communication device based on the selection.

Embodiments of the present disclosure further include a computer-readable medium having program code recorded thereon, the program code comprising code for causing a first wireless communication device to transmit a first signal according to a first numerology including at least a first tone spacing, wherein the first signal indicates a second numerology including at least a second tone spacing; and code for causing the first wireless communication device to transmit a second signal according to the second numerology.

The computer-readable medium further includes wherein the first signal includes a physical broadcast channel (PBCH) signal, and wherein the second numerology is independent from the first numerology. The computer-readable medium further includes wherein the second numerology and the first numerology are different. The computer-readable medium further includes wherein the second signal includes a transmission grant indicating a third numerology, and wherein the computer-readable medium further codes for causing the first wireless communication device to transmit a third signal according to the third numerology. The computer-readable medium further includes wherein the first signal includes first system information associated with a network, and wherein the second signal includes second system information associated with the network. The computer-readable medium further includes code for causing the first wireless communication device to receive, from a second wireless communication device, a request for initial network access; and code for causing the first wireless communication device to transmit, to the second wireless communication device in response to the request, a response according to the second numerology. The computer-readable medium further includes code for causing the first wireless communication device to transmit, to a second wireless communication device, a configuration indicating one or more third numerologies; code for causing the first wireless communication device to transmit, to the second wireless communication device, a third signal indicating a selection of one of the one or more third numerologies; and code for causing the first wireless communication device to communicate, with the second wireless communication device based on the selection. The computer-readable medium further includes wherein the first numerology further includes a number of symbols in a first slot based on the first tone spacing, and wherein the second numerology includes a number symbols in a second slot based on the second tone spacing.

Embodiments of the present disclosure further include a computer-readable medium having program code recorded thereon, the program code comprising code for causing a first wireless communication device to receive a first signal according to a first numerology including at least a first tone spacing, wherein the first signal indicates a second numerology including at least a second tone spacing; and code for causing the first wireless communication device to receive a second signal according to the second numerology.

The computer-readable medium further includes wherein the first signal includes a physical broadcast channel (PBCH) signal and wherein the second numerology is independent from the first numerology. The computer-readable medium further includes wherein the first numerology and the second numerology are different. The computer-readable medium further includes wherein the second signal includes a transmission grant indicating a third numerology, and wherein the computer-readable medium further includes code for causing the first wireless communication device to receive a third signal according to the third numerology. The computer-readable medium further includes wherein the first signal includes receiving first system information associated with a network, and wherein the second signal includes second system information associated with the network. The computer-readable medium further includes code for causing the first wireless communication device to transmit, to a second wireless communication device, a request for initial network access; and code for causing the first wireless communication device to receive, from the second wireless communication device in response to the request, a response according to the second numerology. The computer-readable medium further includes code for causing the first wireless communication device to receive, from a second wireless communication device, a configuration indicating one or more third numerologies; code for causing the first wireless communication device to receive, from the second wireless communication device, a third signal indicating a selection of one of the one or more third numerologies; and code for causing the first wireless communication device to communicate, with the second wireless communication device based on the selection.

Embodiments of the present disclosure further include an apparatus comprising means for transmitting a first signal according to a first numerology including at least a first tone spacing, wherein the first signal indicates a second numerology including at least a second tone spacing; and means for transmitting a second signal according to the second numerology.

The apparatus further includes wherein the first signal includes a physical broadcast channel (PBCH) signal, and wherein the second numerology is independent from the first numerology. The apparatus further includes means for configuring the second numerology to indicate a different numerology than the first numerology. The apparatus further includes wherein the second signal includes a transmission grant indicating a third numerology, and wherein the transceiver is further configured to transmit a third signal according to the third numerology. The apparatus further includes wherein the first signal includes first system information associated with a network, and wherein the second signal includes second system information associated with the network. The apparatus further includes wherein the transceiver is further configured to receive, from a second wireless communication device, a request for initial network access; and transmit, to the second wireless communication device in response to the request, a response according to the second numerology. The apparatus further includes means transmitting, to a second wireless communication device, a configuration indicating one or more third numerologies; means for transmitting, to the second wireless communication device, a third signal indicating a selection of one of the one or more third numerologies; and means for communicating, with the second wireless communication device based on the selection. The apparatus further includes wherein the first numerology further includes a number of symbols in a first slot based on the first tone spacing, and wherein the second numerology includes a number symbols in a second slot based on the second tone spacing.

Embodiments of the present disclosure further include an apparatus comprising means for receiving a first signal according to a first numerology including at least a first tone spacing, wherein the first signal indicates a second numerology including at least a second tone spacing; and means for receiving a second signal according to the second numerology.

The apparatus further includes wherein the first signal includes a physical broadcast channel (PBCH) signal and wherein the second numerology is independent from the first numerology. The apparatus further includes wherein the first numerology and the second numerology are different. The apparatus further includes wherein the second signal includes a transmission grant indicating a third numerology, and wherein the apparatus further includes means for receiving a third signal according to the third numerology. The apparatus further includes wherein the first signal includes first system information associated with a network, and wherein the second signal includes second system information associated with the network. The apparatus further includes means for transmitting, to a second wireless communication device, a request for initial network access; and means for receiving, from the second wireless communication device in response to the request, a response according to the second numerology. The apparatus further includes means for receiving, from a second wireless communication device, a configuration indicating one or more third numerologies; means for receiving, from the second wireless communication device, a third signal indicating a selection of one of the one or more third numerologies; and means for communicating, with the second wireless communication device based on the selection.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a base station, a first signal according to a first numerology, wherein the first signal indicates a second numerology, wherein the first numerology defines a first slot including a first number of symbols having a first tone spacing and a first cyclic prefix (CP) overhead, wherein the second numerology defines a second slot including a second number of symbols having a second tone spacing different from the first tone spacing and a second CP overhead equal to the first CP overhead, and wherein the second slot includes a plurality of mini-slots of different lengths; and
communicating, by the base station with a wireless communication device, a second signal according to the second numerology during a first mini-slot of the plurality of mini-slots in the second slot including a third number of symbols less than the second number of symbols in the second slot,
wherein symbol boundaries of the symbols of the first numerology and symbol boundaries of the symbols of the second numerology are time-aligned at least at every 1 millisecond (ms) time interval.

2. The method of claim 1, wherein the transmitting the first signal includes transmitting a physical broadcast channel (PBCH) signal.

3. The method of claim 1, further comprising:
transmitting, by the base station, a transmission grant according to the second numerology, the transmission grant indicating a third numerology; and
transmitting, by the base station, a third signal according to the third numerology.

4. The method of claim 1, wherein the transmitting the first signal includes transmitting first system information associated with a network, and wherein the method further comprises:
transmitting, by the base station, second system information associated with the network according to the second numerology.

5. The method of claim 4, further comprising:
receiving, by the base station from the wireless communication device, a request for initial network access; and
transmitting, by the base station to the wireless communication device in response to the request, a response according to the second numerology.

6. The method of claim 4, further comprising:
transmitting, by the base station to the wireless communication device, a configuration indicating one or more third numerologies;
transmitting, by the base station to the wireless communication device, a third signal indicating a selection of one of the one or more third numerologies; and
communicating, by the base station with the wireless communication device based on the selection.

7. A method of wireless communication, comprising:
receiving, by a wireless communication device from a base station, a first signal according to a first numerology, wherein the first signal indicates a second numerology, wherein the first numerology defines a first slot including a first number of symbols having a first tone spacing and a first cyclic prefix (CP) overhead, wherein the second numerology defines a second slot including a second number of symbols having a second tone spacing different from the first tone spacing and a second CP overhead equal to the first CP overhead, and wherein the second slot includes a plurality of mini-slots of different lengths; and
communicating, by the wireless communication device with the base station, a second signal according to the second numerology during a first mini-slot of the plurality of mini-slots in the second slot including a third number of symbols less than the second number of symbols in the second slot,
wherein symbol boundaries of the symbols of the first numerology and symbol boundaries of the symbols of the second numerology are time-aligned at least at every 1 millisecond (ms) time interval.

8. The method of claim 7, wherein the receiving the first signal includes receiving a physical broadcast channel (PBCH) signal.

9. The method of claim 7, further comprising:
receiving, by the wireless communication device, a transmission grant according to the second numerology, the transmission grant indicating a third numerology; and
receiving, by the wireless communication device, a third signal according to the third numerology.

10. The method of claim 7, wherein the receiving the first signal includes receiving first system information associated with a network, and wherein the method further comprises:
receiving, by the wireless communication device, second system information associated with the network according to the second numerology.

11. The method of claim 10, further comprising:
transmitting, by the wireless communication device to the base station, a request for initial network access; and
receiving, by the wireless communication device from the base station in response to the request, a response according to the second numerology.

12. The method of claim 10, further comprising:
receiving, by the wireless communication device from the base station, a configuration indicating one or more third numerologies;
receiving, by the wireless communication device from the base station, a third signal indicating a selection of one of the one or more third numerologies; and
communicating, by the wireless communication device with the base station based on the selection.

13. An apparatus comprising:
a transceiver configured to:
transmit a first signal according to a first numerology, wherein the first signal indicates a second numerology, wherein the first numerology defines a first slot including a first number of symbols having a first tone spacing and a first cyclic prefix (CP) overhead, wherein the second numerology defines a second slot including a second number of symbols having a second tone spacing different from the first tone spacing and a second CP overhead equal to the first CP overhead, and wherein the second slot includes a plurality of mini-slots of different lengths; and
communicate, with a wireless communication device, a second signal according to the second numerology during a first mini-slot of the plurality of mini-slots in the second slot including a third number of symbols less than the second number of symbols in the second slot,
wherein symbol boundaries of the symbols of the first numerology and symbol boundaries of the symbols of the second numerology are time-aligned at least at every 1 millisecond (ms) time interval.

14. The apparatus of claim 13, wherein the first signal includes a physical broadcast channel (PBCH) signal.

15. The apparatus of claim 13, wherein the transceiver is further configured to:
transmit a transmission grant according to the second numerology, the transmission grant indicating a third numerology; and
transmit a third signal according to the third numerology.

16. The apparatus of claim 13, wherein the first signal includes first system information associated with a network, and wherein the transceiver is further configured to transmit second system information associated with the network according to the second numerology.

17. The apparatus of claim 16, wherein the transceiver is further configured to:
receive, from the wireless communication device, a request for initial network access; and
transmit, to the wireless communication device in response to the request, a response according to the second numerology.

18. The apparatus of claim 16, wherein the transceiver is further configured to:
transmit, to the wireless communication device, a configuration indicating one or more third numerologies;
transmit, to the wireless communication device, a third signal indicating a selection of one of the one or more third numerologies; and
communicate, with the wireless communication device based on the selection.

19. An apparatus comprising:
a transceiver configured to:
receive, from a base station, a first signal according to a first numerology, wherein the first signal indicates a second numerology, wherein the first numerology defines a first slot including a first number of symbols having a first tone spacing and a first cyclic prefix (CP) overhead, wherein the second numerology defines a second slot including a second number of symbols having a second tone spacing different from the first tone spacing and a second CP overhead equal to the first CP overhead, and wherein the second slot includes a plurality of mini-slots of different lengths; and
communicate, with the base station, a second signal according to the second numerology during a first mini-slot of the plurality of mini-slots in the second slot including a third number of symbols less than the second number of symbols in the second slot, wherein symbol boundaries of the symbols of the first numerology and symbol boundaries of the symbols of the second numerology are time-aligned at least at every 1 millisecond (ms) time interval.

20. The apparatus of claim 19, wherein the first signal includes a physical broadcast channel (PBCH) signal.

21. The apparatus of claim 19, wherein the transceiver is further configured to:
    transmit a transmission grant according to the second numerology, the transmission grant indicating a third numerology; and
    receive a third signal according to the third numerology.

22. The apparatus of claim 19, wherein the first signal includes first system information associated with a network, and wherein the transceiver is further configured to:
    receive, from the base station, second system information associated with the network according to the second numerology.

23. The apparatus of claim 22, wherein the transceiver is further configured to:
    transmit, to the base station, a request for initial network access; and
    receive, from the base station in response to the request, a response according to the second numerology.

24. The apparatus of claim 22, wherein the transceiver is further configured to:
    receive, from the base station, a configuration indicating one or more third numerologies;
    receive, from the base station, a third signal indicating a selection of one of the one or more third numerologies; and
    communicate, with the base station based on the selection.

\* \* \* \* \*